Patented Oct. 25, 1927.

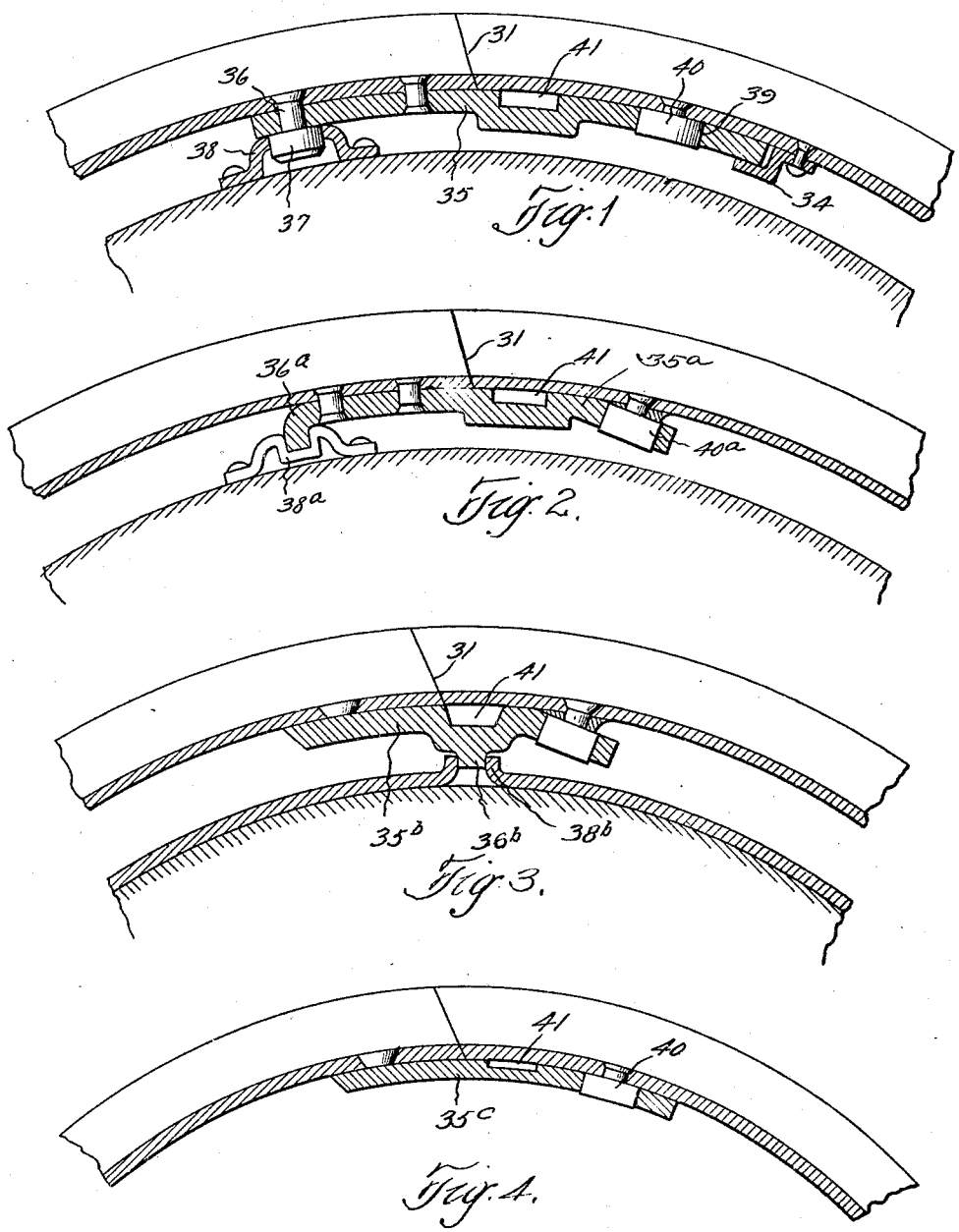

1,646,777

UNITED STATES PATENT OFFICE.

JAMES H. WAGENHORST, OF JACKSON, MICHIGAN.

AUTOMOBILE RIM AND FASTENING MEANS.

Application filed August 9, 1920. Serial No. 402,105.

This invention relates generally to tire carrying rims for automobiles and more particularly to certain features of rim end connecting means.

One object of the invention is to provide a simple and effective construction of rim end connection which will hold said ends against separation both lateral and circumferential.

With these various objects in view the invention consists in the novel detailed features of construction, hereinafter fully described and pointed out in the appended claims.

Fig. 1 is a sectional view showing one form of combined rim end connecting means and driving connection between the rim and felly; Fig. 2 is a similar view of a slightly modified form of device; Fig. 3 shows a still further modification; and Fig. 4 is a similar view showing a connecting plate devoid of a driving connection.

In carrying out my invention, I employ a rim 30 divided at 31, preferably at an oblique angle as shown; and a plate 35 is attached to one end of the rim and projects beyond said end being fastened to the rim by rivets including the rivet 36, having an enlarged head 37 which engages an apertured member 38 and provides a driving connection between the rim 30 and wheel body, it being understood that this wheel body portion can be a channeled sheet metal felly or it may be the felly band applied to a wooden felly. The plate 35 has an opening 39 adjacent the free end which is adapted to receive a stud or rivet head 40 projecting inwardly from the opposite end of the rim, and when the plate fits over and engages this stud or head, the rim ends will be held against lateral and circumferential movement, and the button 34 prevents dislocation of the parts.

The plate 35 is offset or recessed at 41, just beyond the cut 31, to permit a tool such as a screw driver or tire tool to be inserted for the purpose of springing the plate off of the stud or head 40 and moving the rim ends apart radially a short distance and then shifting them laterally if desired.

In Fig. 2 the general features of construction are the same but the plate 35ª has an inturned end 36ª which engages an upset plate 38ª and provides the driving connection. The free end is bent at an angle and the stud 40ª is set at an angle also. The recess 41 is the same as in Fig. 1. The end and stud being set at an angle facilitates the disconnection of the parts when it is desired to collapse the rim and provides a space between the end of the connecting plate and the rim in which a tool can be inserted to collapse the rim.

In Fig. 3, the plate 35ᵇ is riveted to one end of the rim and provided with a central inwardly projecting portion 36ᵇ which engages an outwardly punched portion 38ᵇ of the felly band of the wheel body, thus making the driving connection. The free end and stud are inclined as in Fig. 2 and the recess 41 is arranged just beyond the cut 31.

In Fig. 4 the plate 35ᶜ is curved to conform to the base of the rim, and is devoid of an offset and angled end but is adapted to engage a stud 40 and it has the recess 41 to receive a tool and this plate is shown without the button as it can be so used.

It will thus be seen that I provide in connection with a tire carrying rim a novel form of combined rim end and driving connection capable of operating as and for the purposes set forth.

Having thus described my invention, what I claim is:

1. A tire carrying rim divided at one point, a plate connected to one end of the rim and projecting beyond said end, the free end of the plate being inclined and apertured, and a stud attached to the base of the rim adjacent the opposite end and adapted to engage said aperture, said stud being inclined.

2. A tire carrying rim divided at one point, a plate connected to one end of the rim and projecting beyond said end, said projecting end being inclined to provide a space between said end and the rim, said end also being apertured, and an inclined stud carried by the opposite end of the rim.

3. The combination with a divided rim, of a plate rigidly attached to one end and projecting beyond said end, said plate having a recess intermediate its ends, said projecting end being inclined to provide a space between said projecting end and the rim, said end also being apertured, and an inclined lug carried by the opposite end of the rim.

4. The combination with a transsplit demountable rim, of a plate connected to one end and projecting beyond the split, the free end of the plate being inclined and apertured, an inclined stud carried by the other end of said rim, said plate having a recess in the face adjacent the inner side of the rim base.

In testimony whereof, I hereunto affix my signature.

JAMES H. WAGENHORST.